United States Patent [19]

Renz et al.

[11] Patent Number: 4,531,786
[45] Date of Patent: Jul. 30, 1985

[54] WHEEL COVER FOR WHEELS OF A PASSENGER MOTOR VEHICLE

[75] Inventors: Dieter Renz, Rechberghausen; Bernd Löper, Korb, both of Fed. Rep. of Germany

[73] Assignee: Daimler-Benz Aktiengesellschaft, Stuttgart, Fed. Rep. of Germany

[21] Appl. No.: 471,042

[22] Filed: Mar. 1, 1983

Related U.S. Application Data

[63] Continuation of Ser. No. 187,137, Sep. 15, 1980, abandoned.

[30] Foreign Application Priority Data

Sep. 13, 1979 [DE] Fed. Rep. of Germany ....... 2937083

[51] Int. Cl.³ .................................................. B60B 7/00
[52] U.S. Cl. ............................. 301/37 PB; 301/37 P
[58] Field of Search ............... 301/37 R, 37 P, 37 B, 301/37 AT, 37 T, 37 TP, 37 PB, 108 R, 108 S, 108 SC, 108 A, 375, 375 C, 37 C, 37 CD; 220/320; 292/256.6, 256.61, 256.65

[56] References Cited

U.S. PATENT DOCUMENTS

| | | | |
|---|---|---|---|
| 1,817,194 | 8/1931 | Hunt | 301/108 R |
| 2,736,610 | 2/1956 | Waite | 301/37 P |
| 2,746,805 | 5/1956 | Gamundi | 301/37 R |
| 3,397,918 | 8/1968 | Aske, Jr. et al. | 301/37 P |
| 3,619,010 | 11/1971 | Foster | 301/108 R X |
| 3,671,076 | 6/1972 | Aske, Jr. | 301/37 P |
| 3,747,984 | 7/1973 | Andrews et al. | 301/37 P |
| 4,027,919 | 6/1977 | Foster et al. | 301/37 P X |
| 4,232,907 | 11/1980 | Beisch | 301/37 R |

FOREIGN PATENT DOCUMENTS 2643314  3/1978  Fed. Rep. of Germany .... 301/37 R

*Primary Examiner*—Charles A. Marmor
*Attorney, Agent, or Firm*—Craig & Burns

[57] ABSTRACT

A wheel cover for wheels of a passenger motor vehicle which includes a wire ring with outwardly bent lug-shaped members distributed along the circumference thereof, which are adapted to engage in an annular recess in the wheel rim for holding the wheel cover in place; the lug-shaped members are held in radial and axial directions within a guide structure at the wheel cover; each guide structure is provided with an internal radial abutment in such a manner that the wire ring, in the non-mounted condition of the wheel cover, is under prestress; covers elastically connected to the wheel cover are associated with the guide structures on the outside thereof whereby the covers extend over at least a portion of the radially outermost area of each lug-shaped member.

20 Claims, 5 Drawing Figures

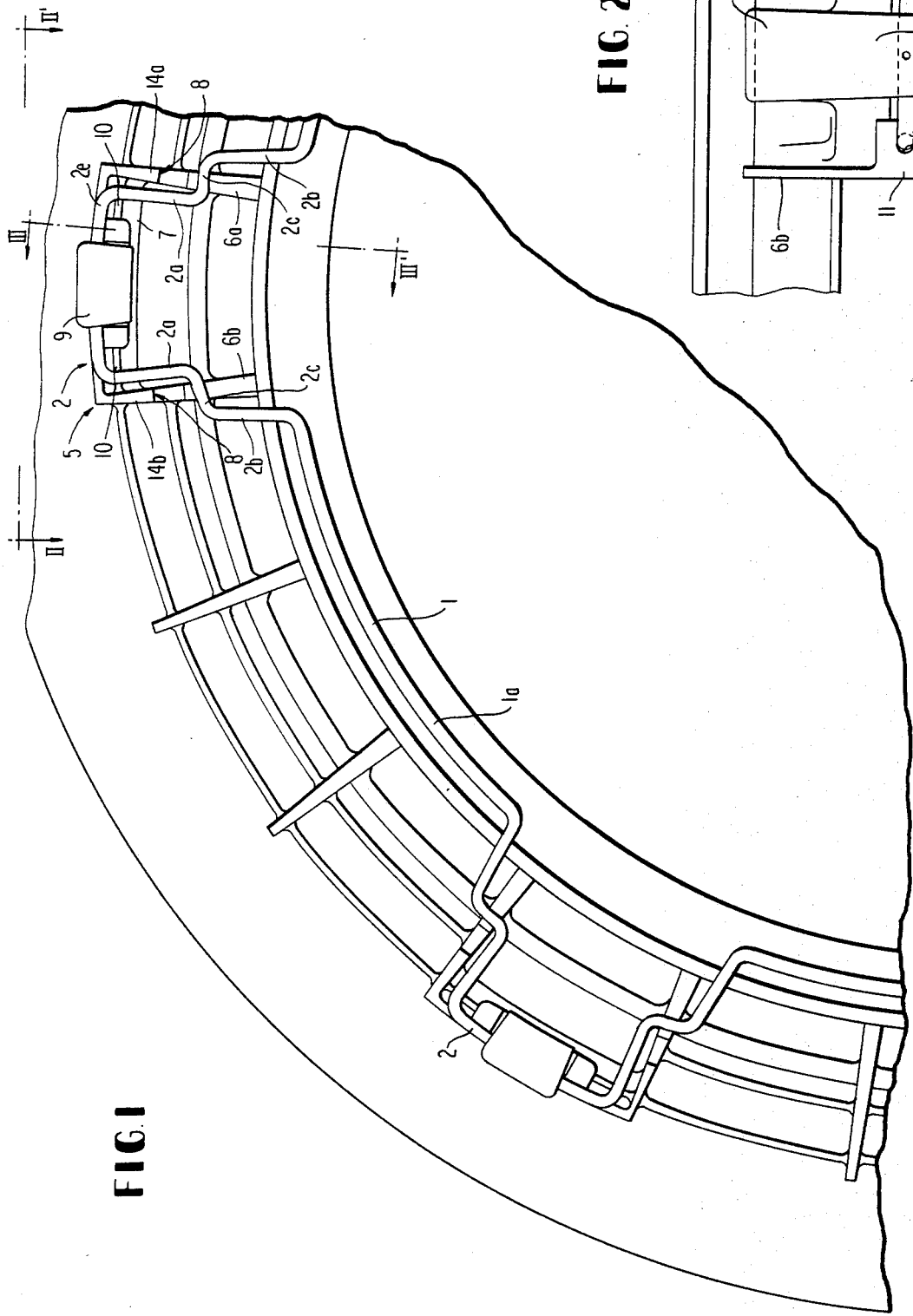
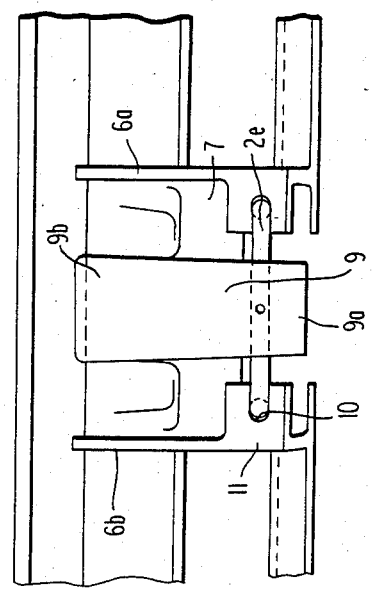

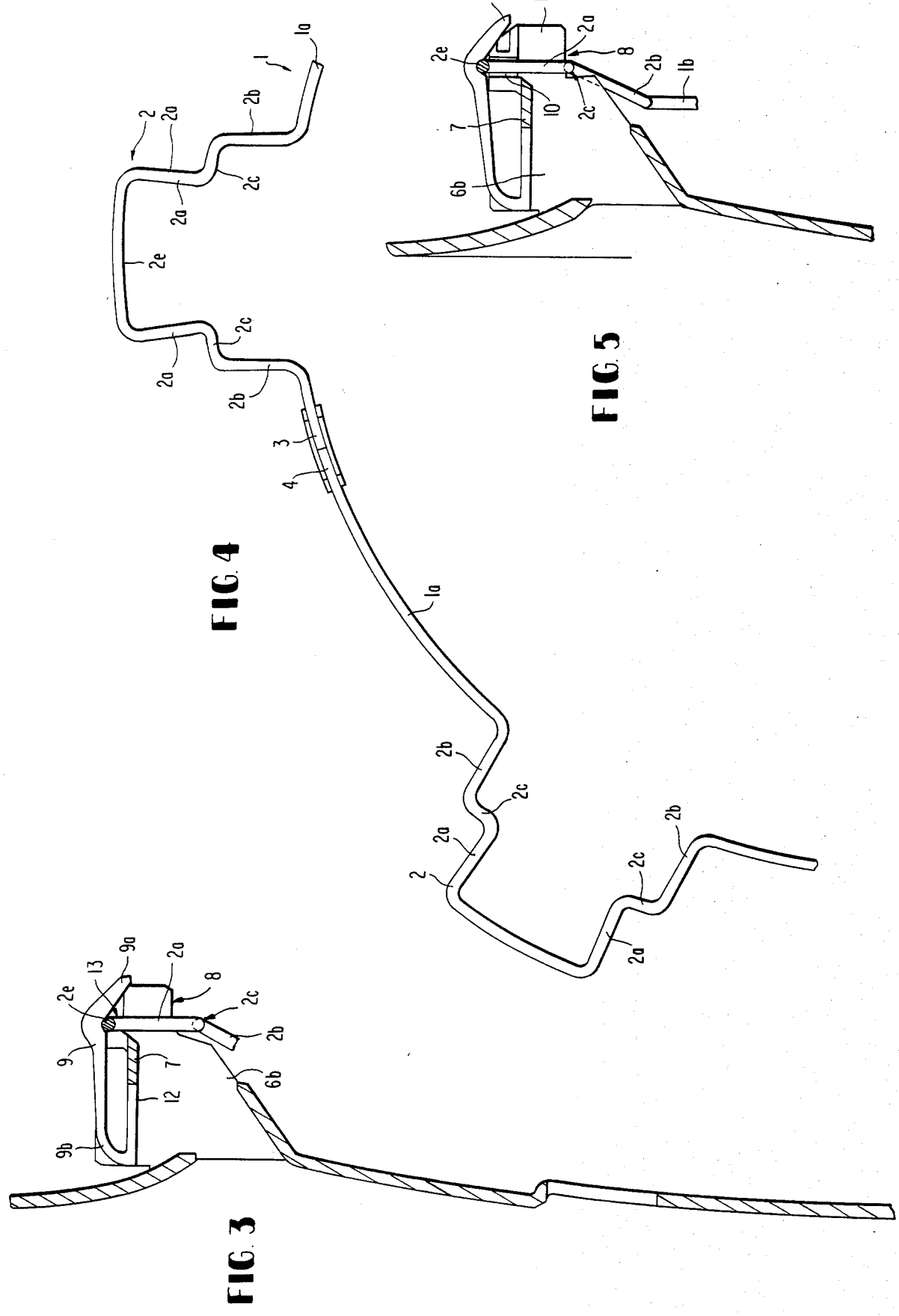

WHEEL COVER FOR WHEELS OF A PASSENGER MOTOR VEHICLE

This application is a continuation application of parent application Ser. No. 187,137, filed Sept. 15, 1980, now abandoned.

The present invention relates to a wheel cover, and more particularly, to wheel cover for wheels of a passenger motor vehicle which includes a resilient wire ring having outwardly bent lug-shaped members distributed along a circumference and adapted to engage in an annular recess of the wheel rim to hold the wheel cover in place and, which are held in a radial and axial direction by means of guide means arranged at the wheel cover.

Wheel covers of the aforementioned type are known in the prior art (U.S. Pat. No. 2,746,805 and German Offenlegungsschrift No. 26 22 908). The prior art constructions consist either of a wire ring whose lug-shaped members are resilient while the other areas of the ring are held radially fixed at the wheel cover, or of lug-shaped members guided in radial and axial directions, in which case the remaining area of the wire ring is without guidance and is capable of spring movements.

A disadvantage of the aforementioned prior art types of wheel cover constructions resides in the fact that relatively large forces, exerted by the resilient wire ring, must be overcome during installation of the wheel cover, so that the rim of the wheel is scratched or damaged by the lug-shaped wire members when pressed-in. This is particularly true if, for example, the rim of the wheel is made of aluminum or of a similar material.

These large forces of the prior art construction are attributable to the fact that a relatively stiff wire ring must be employed in order to ensure an adequate and firm seating of the wheel cover on the rim of the wheel. Consequently, wire rings having a relatively soft spring characteristic cannot be used because otherwise excessive spring displacements would have to be traversed to ensure a sufficiently firm seating of the wheel cover at the rim of the wheel. However, this cannot be realized with the prior art types of wheel cover constructions because of the necessary installation of the wheel cover.

Added thereto is the fact that if deviations in the spring characteristics occur as a result of manufacturing tolerances, the prior art fastening arrangements tend to rattle. A sufficiently firm seating of the prior art wheel cover in the rim of the wheel is thereby not always assured in the direction of rotation.

Accordingly, it is the object of the present invention in so constructing a wheel cover that only small spring displacements have to be overcome for installing the wheel cover at the rim in order that a metallic seating and rattling of the wire ring in the rim of the wheel are avoided.

The underlying problems are solved in accordance with the present invention in that the guide means are provided with an inner radial abutment in such a manner that the wire ring, in the non-installed condition of the wheel cover, is under prestress, and in that cover members are associated with the guide means on the outside thereof, which are elastically connected with the wheel cover. As a result of this arrangement in accordance with the present invention, the engageable lug-shaped parts of the wire ring are enclosed on the outside by a kind of cushion which is connected freely resiliently in the radial direction as well as in the axial direction but non-detachably with the wheel cover.

Since, in accordance with the present invention, the wire ring itself is under prestress, according to their invention the cover members are pressed with great force into corresponding recesses of the rim of the wheel and assure a satisfactory seating safe against axial removal of the wheel cover as well as against twisting or rotation in the circumferential direction. Moreover, the novel arrangement of the present invention makes it possible to impart to the wire ring, respectively, the lug-shaped members a relatively soft spring characteristic. Nonetheless, adequate holding forces are attained because the resilient wire ring, prior to installation, is already seated in prestressed condition within the wheel cover so that, during the installation, only small spring displacements have to be overcome when pressing the lug-shaped parts into the annular recess provided in the rim of the wheel; notwithstanding this arrangement, however, a tight and rattle-free seating is assured.

In accordance with further features of the present invention, the cover members may be constructed as pivotal clip-like members arranged on the inside of the wheel cover soo that they can be molded, for example, integrally with the wheel cover made of, for example, a synthetic resinous material. Advantageously, the clip-like members may be provided with a leg portion which extends externally over the engageable lug-shaped members and is provided with an internal groove for receiving the lug-shaped part of the wire ring so that the cover members are fixedly attached to the lug-shaped member but are freely movable with respect to the wheel cover. The wheel cover, properly speaking, can thus remain free, also with this construction, of forces exerted by the wire ring.

The leg portion of the clip-like member may, for example, be of roof shape and may have a cam-like outer contour in the area of the internal groove, whose curvature extends in the direction of the curvature of the annular recess in the wheel rim so that a satisfactory seating is ensured, by means of which large friction forces can be exerted. The free end of the roof-shaped leg portion may also be provided with a front edge which is radially beveled toward the inside, and thereby offers the significant advantage that it may serve as inserting slide surface during the installation of the wheel cover.

Advantageously, the lug-shaped parts of the wire ring may be provided with radially outwardly extending lateral brace portions and with an approximately tangentially extending cross web forming the outermost area of the lug-shaped parts, over which extend the cover members. It has been found that satisfactory transmission of spring forces can be obtained in this manner. This construction is also advantageous in that the guide means for the lug-shaped parts may be constructed as grooves in the wheel cover which extend approximately radially and face each other with their open sides, whereby the grooves are delimited in the downward direction by a radial abutment, against which the prestressed wire ring is supported.

In accordance with the present invention, the wire ring proper may also be advantageously bent in two planes, whereby the lug-shaped parts extend in a plane approximately parallel to the plane of the annular area of the wire ring, and more particularly in such a way that the plane, in which the lug-shaped parts lie, faces the inside of the wheel cover. By virtue of this construction, stable conditions are provided during the elastic bending of the wire ring which avoid an unstable behavior during elastic yielding and additionally entail the significant advantage that a degressive characteristic may be obtained for the fastening ring which by reason of the prestressing of the wire ring, permits the operating force to remain within a nearly constant range of the characteristic curve. This produces the advantage that the holding force for the wheel cover will stay at the same magnitude, even if manufacturing tolerance deviations in the installation dimensions occur.

The construction in accordance with the present invention therefore offers the advantage that defined and predeterminable fastening forces can be achieved and that the movement of the wheel cover with respect to the wire ring, which in prior art constructions may lead in due course to damages of the guide means, may be dampened by the arrangement of the lug-shaped covers, if the thickness of the elastic leg portion of the cover member extending over the lug-shaped part of the wire ring is selected properly.

Accordingly, it is an object of the present invention to provide a wheel cover for wheels of a passenger motor vehicle which avoids, by simple means, the aforementioned shortcomings and disadvantages encountered in the prior art.

Another object of the present invention resides in providing a wheel cover for wheels of a motor vehicle which ensures an easy installation of the wheel cover onto a rim of the wheel of the motor vehicle. Still another object of the present invention resides in providing a wheel cover for wheels of a motor vehicle which ensures a tight and rattle-free seating of the wheel cover at the rim of the wheel.

A still further object of the present invention resides in providing a wheel cover which is simple in construction and therefore relatively inexpensive to manufacture.

Another object of the present invention resides in providing a wheel cover for passenger motor vehicles which compensates for any tolerance deviations which may occur during manufacture of the wheel cover or of the rim of the wheel.

These and other objects, features and advantages of the present invention will become more apparent from the following description when taken in connection with the accompanying drawings which show, for purposes of illustration only, one embodiment in accordance with the present invention, and wherein:

FIG. 1 is a fragmentary rear view of a wheel cover with an inserted fastening device in the form of a wire spring ring, disposed in the operative position, in accordance with the present invention;

FIG. 2 is a plan view of a portion on the wheel cover of the present invention, taken in the direction of the line II—II in FIG. 1, on which is retained an engageable lug-shaped member;

FIG. 3 is a fragmentary cross-sectional view taken along the line III—III' in FIG. 1, in which the lug-shaped member and a cover extending thereover are shown in an operative position;

FIG. 4 is a partial view of a wire spring ring and associated lug-shaped sections in accordance with the present invention; and FIG. 5 is a partial cross-sectional view corresponding to FIG. 3 wherein the engageable lug-shaped member of the wire spring ring and the cover are shown in a position after insertion in the wheel cover and prior to an installation of the wheel cover on a rim of the wheel of a motor vehicle.

Referring now to the drawings wherein like reference numerals are used throughout the various views to designate like parts and more particularly to FIG. 1, this figure is a rear elevational view of a wheel cover with a wire spring ring generally designated by the reference numeral 1 as fastening device. The spring ring 1 consists of a plurality of sections 1a extending in the shape of sections of a circular ring and of lug-shaped sections generally designated by the reference numeral 2 arranged equiangularly to one another. The lugshaped sections 2 each include radially extending lateral brace portions 2a and 2b and a transverse web portion 2e. The spring ring 1, with its circular ring sections 1a and lug-shaped members 2, is formed as an endless body as shown most clearly in FIG. 4.

The brace portions 2a and 2b are additionally bent into differing planes, shown most clearly in FIG. 5, so that upper brace portions 2a of the lug-shaped members 2 lie in a plane extending approximately parallel to a plane in which also lie the circular ring-shaped sections 1a of the spring 1. The lower lateral brace portions 2b form the connecting legs of the circular ring-shaped sections 1a to the lateral brace portions 2a. Moreover, as shown in FIG. 4, a short sections 2c is provided between the upper and lower lateral brace portions 2a and 2b, from which results the configuration of the spring ring 1 shown in FIGS. 4 and 5. The sections 2c extend parallel to the transverse web portion 2e. As shown in FIG. 4, the two ends 3, 4 of the springring 1 are, for example, wedged together or welded together.

As shown in FIG. 1, the wheel cover includes guide means generally designated by reference numeral 5 which are arranged corresponding to the annular spacings of the lug-shaped members 2 and whose construction will be more fully described with reference to FIGS. 2 and 3. More particularly, the guide means 5 include walls 6a and 6b arranged in a plane at right angles to the plane of the drawing in FIG. 1, which are illustrated in side view in FIGS. 3 and 5 and are joined together by a web 7. As shown in FIG. 5, the walls 6a and 6b are provided with a step-shaped abutment 8 on the side thereof facing the center of the wheel cover, the abutment 8 being in contact with the lug portions 2c when the spring ring 1 assumes its position in the wheel cover corresponding to the not yet installed position of the wheel cover (FIG. 5). The function of the abutment 8 will be explained more fully hereinbelow.

In the embodiment of FIG. 1, the lug-shaped member 2 is inserted into the wheel cover in such a manner that the cross portion 2c is disposed facing the abutment 8, whereas the upper portion 2a of the lug-shaped member 2, as shown in FIG. 1, extends approximately radially toward the outside so that the cross web 2e adjoining the upper portion 2a passes underneath the clip-like cover member 9. As shown in FIG. 2, the wheel cover is provided with grooves 10 extending approximately radially toward the outside which receive the lateral brace portions 2a of the lug-shaped member 2 and provide, by virtue of the side walls 11, a lateral boundary for the lug-shaped member 2. The lateral brace portions 2a of the lug-shaped member 2 are therefore secured against a displacement within the retaining sections formed by the walls 6a, 6b and 11 of the wheel cover.

The clip-like cover members 9 and grooves 10 together with the abutment 8 form the guide means 5 for the spring ring 1. The cover member 9, the configuration of which is shown in FIG. 3, includes a base portion 12 which passes over into the connecting web 7. The cover member 9 is therefore elastically attached to the wheel cover. The cover member 9 includes an internal groove or recess generally designated by reference numeral 13 which is matched to the material diameter of the spring ring 1 and is preferably of semi-circular shape. The groove or recess 13 serves for receiving the upper cross web 2e of the lug-shaped members 2 and is located in proximity of the freely moveable end 9a of the cover 9.

As shown in the side view of FIG. 3, the free end 9a of the cover member 9 has a shape which extends obliquely in a downward direction and is located on the side of the wheel cover facing the rim of the wheel. The beveling of the cover members 9 in the form of the free ends 9a, which extend downwardly and toward the center axis, serves to facilitate placing the wheel cover on the mounting surface of the wheel rim (not shown). An area 9b of the cover members 9, disposed opposite the free end 9a, is bent and is flexible in such a manner that a movement of the free end 9a with respect to the base section 12 is possible for mounting the wheel cover on the rim of the wheel.

In the embodiment described hereinabove, the spring ring, shown in particular in FIG. 4, is inserted into the wheel cover according to FIG. 1 in such a manner that its lug-shaped members 2 come to lie with their upper portions 2a in the grooves 10 of the wheel cover guide means. Before the wheel cover is mounted on the rim of the wheel, each lug-shaped member 2 assumes the position illustrated in FIG. 5, in which each portion 2c of the lug-shaped members 2 comes into abutment with the associated abutment 8, as a result of which the forces of the spring prestress are absorbed by the walls 6a and 6b by way of the abutments 8 formed thereat. This means that the cross webs 2e of the lug-shaped members 2 do not reach a position corresponding to complete unstressing of the spring ring 1 but rather assume the position shown in FIG. 5, in which the free ends 9a of the covers 9 are in a raised position with respect to the forward ends 14a and 14b of the walls 6a and 6b. The forward ends 14a and 14b assure a secure mounting of the lug-shaped members 2 in the wheel cover since they constitute parts of the wheel cover, preferably integral components of the wheel cover, which are made in one piece with the walls 6a and 6b, the webs 7 and the remaining surfaces of the wheel cover.

Prior to the attachment of a wheel cover, the lower portions 2b of the lug-shaped members 2 extend at an obtuse angle with respect to the upper portions 2a. The circular sections 1a of the spring ring 1 adjoining the lower portions 2b lie, as shown in FIG. 5, in a plane approximately parallel to the plane of the upper portions 2a. By virtue of the above-described arrangement of the spring ring 1 in connection with the wheel cover, it is achieved that the spring ring 1 is under a prestress by means of the lug-shaped members 2 as a result of the cooperation of the portions 2c and the abutments 8 since the lug-shaped members 2 cannot completely expand in the radial direction. Consequently, only a comparatively short spring displacement of the lug-shaped members 2 and, more particularly, of the cross webs 2e, has to be overcome during the mounting of the wheel cover until the wheel cover together with the spring ring 1 have been installed in the associated wheel rim. Nonetheless, large assembly forces are assured in this construction.

FIG. 3 shows the position of the lug-shaped member 2 in a mounted condition of the wheel cover and illustrates the movement which each cross member 2c of the lug-shaped members 2 must undergo from the position shown in FIG. 5 in order that the wheel cover can be attached to the rim of a wheel. As a result of the oblique extension of the free ends 9a of the covers 9, which cause the inwardly directed movement of the cross portions 2c during the mounting of the wheel cover, the attachment of the wheel cover to the rim of the wheel is facilitated. In the installed condition, the spring ring 1 therefore exerts a force effect on the rim of the wheel by way of its lug-shaped members 2 and the cover members 9. The wheel cover, properly speaking, is thus relieved of a permanent spring load or spring stress since the spring forces act on the rim of the wheel exclusively by way of the elastic cover members 9.

In the mounted condition, the wheel cover is not subjected by the spring ring 1 to any radial or axial forces since the guide grooves 10 are constructed correspondingly. In the axial direction, a small amount of play is appropriately permitted for the lateral brace portions 2a in the guide grooves 10. Since the lug-shaped members 2 are retained in the cover members 9, they take over a guiding function in the axial direction. The cover members 9 may be so constructed that they provide an excellent vibration damping opposing such axial movements as may occur during operation of the motor vehicle. Unpleasant rattling noises are therefore avoided.

A soft spring characteristic is obtained by the described construction of the wheel cover in accordance with the present invention since the spring or spring ring 1 is prestressed in the manner described hereinabove by way of the abutment sections 8 in the preinstalled condition corresponding to FIG. 5. As a result thereof, only a certain residual spring displacement must be overcome for the purpose of mounting the wheel cover which assures the engagement and retention of the wheel cover in the operative position and takes into consideration certain manufacturing tolerances. Consequently, the manufacturing tolerances of the wheel cover, of the spring ring 1 and of the rim of the wheel as well as the thermal expansion phenomena have practically no effect on the uniformity of the forces exerted by the spring ring 1 on the rim of the wheel.

The construction described hereinabove in connection with FIGS. 1 to 3 and 5 may be modified to the effect that the wheel cover does not have to be provided with cover members 9. As to the rest, the construction of the wheel cover and the form of the spring ring are same; however, the guide means which serve as retention for the spring ring 1 are to be constructed in such a manner that the spring ring 1, in the installed condition of the wheel cover on the wheel rim, retains the wheel cover, which is achieved in the construction according to FIGS. 1 to 3 and 5 by cover members 9. According to a preferred embodiment, the depth of the grooves 10 (FIG. 2) is so selected that in the operative position, that is, in the installed condition of the wheel cover (FIG. 1), the upper lateral brace portions 2a of the lug-shaped members 2 are held between the walls 11 and thereby retain the wheel cover with respect to the rim of the wheel. At least within the area of the lug-shaped members 2, the spring ring 1 is coated with a layer of a synthetic resinous material which forms a covering. This synthetic resinous material coating avoids scratching of the wheel rim by the engageable lug-shaped members 2 and effects a vibration damping in a similar manner to the cover members 9. However, the construction with the cover members 9 is preferred in that respect.

The operation of a thus-modified wheel cover, as to the rest, is the same as described hereinabove with respect to FIGS. 1 to 3 and 5.

While we have shown and described several embodiments in accordance with the present invention, it is understood that the same is not limited thereto, but is susceptible of numerous changes and modifications as known to one having ordinary skill in the art, and we therefore do not wish to be limited to the details shown and described herein, but intend to cover all such changes and modifications as are encompassed by the scope of the appended claims.

We claim:

1. A wheel cover for wheels of a passenger motor vehicle including a resilient wire ring means having a plurality of outwardly bent lug-shaped means distributed along a circumference thereof, which, for the purpose of mounting the wheel cover, are operable to engage in an annular recess of a wheel rim and are retained in the radial and axial directions in guide means, characterized in that the guide means include an inner radial abutment means in such a manner that the wire ring means is under a prestress in the unmounted condition of the wheel cover by engagement with the abutment means and in that cover means elastically connected to the wheel cover are coordinated to the guide means on the outer side thereof, said cover means extending over at least a portion of the radially outermost area of each lug-shaped means and being operable to cause the lug-shaped means to disengage from the abutment means and thereby relieve the wheel cover from the prestress of the wire ring means when the wheel cover is mounted on the wheel rim.

2. A wheel cover according to claim 1, characterized in that the cover means are constructed as clip-like elements pivotably arranged on the inside of the wheel cover.

3. A wheel cover according to claim 2, characterized in that each of the clip-like elements includes a leg member externally extending over the lug-shaped means and provided with an internal groove means for accommodating at least a part of the associated lug-shaped means.

4. A wheel cover according to claim 3, characterized in that the leg member is constructed substantially roof-shaped and includes a cam-like outer contour within the area of the internal groove means, the curvature of the cam-like outer contour extending in the direction of the curvature of the annular recess in the rim of the wheel.

5. A wheel cover according to claim 4, characterized in that a free end of the leg member includes a front edge which is beveled off radially inwardly.

6. A wheel cover according to claim 5, characterized in that the lug-shaped means each includes radially outwardly extending lateral brace portions and an approximately tangentially extending cross portion forming the outermost area, the cover means extending over the cross portions.

7. A wheel cover according to claim 6, characterized in that the guide means include at least a pair of approximately radially extending grooves facing each other with the open ends thereof and provided in the wheel cover, the grooves being delimited in the downward direction by the radial abutment means.

8. A wheel cover according to claim 7, characterized in that the wire ring means is bent in two planes, the lug-shaped means extending in a plane disposed approximately parallel to the plane of the circular area of the wire ring means.

9. A wheel cover according to claim 8, characterized in that the plane in which the lug-shaped means are located faces the inside of the wheel cover.

10. A wheel cover according to claim 3, characterized in that the lug-shaped means each includes radially outwardly extending lateral brace portions and an approximately tangentially extending cross portion forming the outermost area, and in that the cover means extend over the cross portion.

11. A wheel cover according to claim 3, characterized in that the guide means include at least a pair of approximately radially extending grooves facing each other with the open ends thereof and provided in the wheel cover, said grooves being delimited in the downward direction by the radial abutment means.

12. A wheel cover according to claim 2, characterized in that the wire ring means is bent in two planes, the lug-shaped means extending in a plane disposed approximately parallel to the plane of the circular area of the wire ring means.

13. A wheel cover according to claim 12, characterized in that the plane in which the lug-shaped means are located faces the inside of the wheel cover.

14. A wheel cover according to claim 2, characterized in that the lug-shaped means each includes radially outwardly extending lateral brace portions and an approximately tangentially extending cross portion forming the outermost area, and in that the cover means extend over the cross portion.

15. A wheel cover according to claim 2, characterized in that the guide means include at least a pair of approximately radially extending grooves facing each other with the open ends thereof and provided in the wheel cover, said grooves being delimited in the downward direction by the radial abutment means.

16. A wheel cover according to claim 1, characterized in that the wire ring means is bent in two planes, the lug-shaped means extending in a plane disposed approximately parallel to the plane of the circular area of the wire ring means.

17. A wheel cover according to claim 16, characterized in that the plane in which the lug-shaped means are located faces the inside of the wheel cover.

18. A wheel cover according to claim 1, characterized in that the lug-shaped means each includes radially outwardly extending lateral brace portions and an approximately tangentially extending cross portion forming the outermost area, and in that the cover means extend over the cross portion.

19. A wheel cover according to claim 1, characterized in that the guide means include at least a pair of approximately radially extending grooves facing each other with the open ends thereof and provided in the wheel cover, said grooves being delimited in the downward direction by the radial abutment means.

20. A wheel cover for wheels of a passenger motor vehicle including a resilient wire ring means having a plurality of outwardly bent lug-shaped means distributed along the circumference thereof, which, for the purpose of mounting the wheel cover, are operable to engage in an annular recess of a wheel rim and are retained in the radial and axial directions in guide means, characterized by further means in said wheel cover including inner radial abutment means on the guide means to enable a relatively soft spring characteristic for said wire ring means with relatively small spring displacements during assembly of the wheel cover onto the wheel rim by inward spring deflections of the lug-shaped means during such assembly, said abutment means being operable to engage with parts of the lug-shaped means for prestressing the wire spring means in the unmounted condition of the wheel cover, said parts of the lug-shaped means being operable to be disengaged from said abutment means upon application of forces on the outer areas of said lug-shaped means from the wheel rim during such assembly and while the wheel cover is installed on the wheel rim to thereby relieve the wheel cover from the prestress of the wire spring means, the cover means elastically connected to the wheel cover extending over at least a portion of the radially outermost area of each lug-shaped means, said cover means being effectively disposed between the outermost areas of said lug-shaped means and the annular recess of the wheel rim and being coordinated to the guide means on the outer side thereof.

* * * * *